US 6,692,130 B1

(12) United States Patent
Snow

(10) Patent No.: US 6,692,130 B1
(45) Date of Patent: Feb. 17, 2004

(54) SOLAR POWERED HEATING AND VENTILATION SYSTEM FOR VEHICLE

(76) Inventor: Christopher E. Snow, 10183 Green Meadow Dr., King George, VA (US) 22485

( * ) Notice: Subject to any disclaimer, the term of this patent is extended or adjusted under 35 U.S.C. 154(b) by 0 days.

(21) Appl. No.: 10/309,214

(22) Filed: Dec. 4, 2002

(51) Int. Cl.[7] .................................................. B60H 1/00
(52) U.S. Cl. ...................... 353/137; 454/139; 454/141; 454/159; 454/900
(58) Field of Search .......................... 454/75, 137, 139, 454/141, 145, 159, 900

(56) References Cited

U.S. PATENT DOCUMENTS

| | | |
|---|---|---|
| 3,943,726 A | 3/1976 | Miller |
| 4,939,986 A | 7/1990 | Turner |
| 4,942,806 A | 7/1990 | Hwang |
| 4,953,448 A | 9/1990 | Duh |
| 4,955,203 A | 9/1990 | Sundhar |
| 5,040,455 A | 8/1991 | Doi et al. |
| 5,081,912 A | 1/1992 | Clenet |
| 5,148,736 A | 9/1992 | Juang |
| 5,167,574 A | 12/1992 | Ikeda et al. |
| 5,205,781 A | 4/1993 | Kanno et al. |
| 5,205,782 A | 4/1993 | Ohba et al. |
| 5,248,278 A | 9/1993 | Fuerst et al. |
| 5,344,361 A | 9/1994 | Matthias |
| 5,433,660 A | 7/1995 | Ohba |
| 5,588,909 A | 12/1996 | Ferng |
| 6,158,225 A | 12/2000 | Muto et al. |
| 6,186,886 B1 | 2/2001 | Farrington et al. |
| 6,433,915 B2 | 8/2002 | Mounir |
| 6,435,961 B1 | 8/2002 | Biancone |
| 6,439,658 B1 | 8/2002 | Ganz et al. |

FOREIGN PATENT DOCUMENTS

| | | | |
|---|---|---|---|
| DE | 4437209 | | 8/1995 |
| DE | 10021807 | | 11/2001 |
| EP | 1024038 | | 8/2000 |
| GB | 2220738 A | * | 1/1990 |
| JP | 114522 | | 6/1989 |
| JP | 2001-206046 A | * | 7/2001 |
| SE | 468668 | | 3/1993 |

* cited by examiner

Primary Examiner—Jiping Lu
(74) Attorney, Agent, or Firm—Richard C. Litman

(57) ABSTRACT

A solar powered heating and ventilation system maintains an unoccupied vehicle at a more comfortable temperature relative to the outside temperature using both heating and cooling as appropriate. The system uses an air duct having a fan, heating element, vents, flaps, selector switch and power control circuits. The system also uses an electronic solar power panel and battery as power sources. The system provides power to the fan and heating elements via a selector switch and power control circuits. The power control circuits are connected to the vehicle battery and electronic solar power cells. The duct is located on the interior ceiling of the vehicle and has at least three vents.

20 Claims, 3 Drawing Sheets

SOLAR POWERED HEATING AND VENTILATION SYSTEM FOR VEHICLE

BACKGROUND OF THE INVENTION

1. Field of the Invention

The present invention relates to a system for maintaining an unoccupied vehicle at a more comfortable temperature relative to the outside temperature using both heating and cooling. The system uses an air duct with a fan, a heating element, vents, a solar panel and other control elements.

2. Description of the Related Art

On warm or hot days with the sun up, a vehicle parked unoccupied in the sun will experience a greenhouse like heating effect that is much more uncomfortable for driver and passengers to tolerate when entering than if the vehicle was parked in the shade. Alternately, when the vehicle has been parked unoccupied on a cold night and/or day, the vehicle may be very uncomfortable for the driver and passengers to tolerate when entering.

In the prior art, systems for providing an unoccupied vehicle with a more comfortable temperature used systems for cooling and/or ventilating the vehicle using solar power and/or batteries as the power source and a fan for forcing the ventilation.

Exemplary references of this type are: U.S. Pat. No. 3,943,726 to Miller issued on Mar. 16, 1976; U.S. Pat. No. 4,939,986 to Turner issued on Jul. 24, 1990; U.S. Pat. No. 4,942,806 to Hwang issued on Jul. 24, 1990; U.S. Pat. No. 4,953,448 to Duh issued on Sep. 4, 1990; U.S. Pat. No. 4,955,203 to Sundhar issued on Sep. 11, 1990; U.S. Pat. No. 5,040,455 to Doi et al. issued on Aug. 20, 1991; U.S. Pat. No. 5,081,912 to Clenet issued on Jan. 21, 1992; U.S. Pat. No. 5,148,736 to Juang issued on Sep. 22, 1992; U.S. Pat. No. 5,167,574 to Ikeda et al. issued on Dec. 1, 1992; U.S. Pat. No. 5,205,781 to Kanno et al. issued on Apr. 27, 1993; U.S. Pat. No. 5,205,782 to Ohba et al. issued on Apr. 27, 1993; U.S. Pat. No. 5,248,278 to Fuerst et al. issued on Sep. 28, 1993; and U.S. Pat. No. 5,344,361 to Matthias issued on Sep. 6, 1994.

Other exemplary references of this type are: U.S. Pat. 5,433,660 to Ohba issued on Jul. 18, 1995; U.S. Pat. No. 5,588,909 to Ferng issued on Dec. 31, 1996; U.S. Pat. No. 6,158,225 to Muto et al. issued on Dec. 12, 2000; U.S. Pat. No. 6,186,886 to Farrington et al. issued on Feb. 13, 2001; U.S. Pat. No. 6,435,961 to Biancone issued on Aug. 20, 2002; U.S. Pat. No. 6,439,658 to Ganz et al. issued on Aug. 27, 2002; Japanese Patent 114,522 published Jun. 1989; Swedish Patent 468,668 published Mar. 1993; German Patent 4,437,209 published Aug. 1995; European Patent 1,024,038 published Aug. 2000; and German Patent 10,021,807 published Nov. 2001.

In the above prior art systems, no device was provided for adding extra heat to circulated air inside the vehicle to make the interior of the vehicle more comfortable to enter during cold weather.

In another prior art system shown in U.S. Pat. No. 6,433,915 to Mounir issued on Aug. 13, 2002, an unoccupied vehicle is maintained at a more comfortable temperature by providing a system using a complex film on the windows that changes state via electrical or temperature changes applied to the film, resulting in a change of color. The color changes serve to heat or cool the vehicle via reflection or absorption of sunlight. This prior art system implements a system to heat and cool the inside of the vehicle that is slow and which may not provide the amount of comfort level associated with the system in the present invention.

It would be desirable to have a system for maintaining an unoccupied vehicle at a more comfortable temperature by providing both heating and cooling using solar power and batteries as the power source and using an electric fan and a heater.

None of the above inventions and patents, taken either singly or in combination, is seen to describe the instant invention as claimed. Thus, a solar powered heating and ventilation system for vehicle solving the aforementioned problems is desired.

SUMMARY OF THE INVENTION

The present invention is a system for maintaining an unoccupied vehicle at a more comfortable temperature relative to the outside temperature using both heating and cooling, as appropriate.

The system uses an air duct having an electric fan, an electric heater, vents, a flap controller and flaps. The system also uses a solar power panel, battery, selector switch and power control circuits. The system provides power to the electric fan and electric heater via a selector switch and power control circuits. The duct is located on the interior ceiling of the vehicle and has at least three vents. The fan and heater are located inside the duct. The first input vent is located on one side of the fan and heater at the front of the vehicle and the other two vents and flaps are located on the other side of the fan and heater at the rear of the vehicle. One of the other two vents opens to the interior of the vehicle. A second of the other two vents opens to the exterior of the vehicle above the rear window.

When there is a need to cool the interior of the vehicle due to the heat of the sun acting on the vehicle as if it were a greenhouse, air enters the duct through the first input vent pulled by the fan mounted in the duct to the second of the other two vents opening at the exterior of the vehicle so that hot air can exit. Flaps in the first of the other two vents are pushed or pulled closed to close off the exit of air back into the vehicle. When there is a need to heat the insides of the vehicle due the lack of sun and cold outside temperatures, the interior vehicle air enters the duct through the first input vent pulled by the fan and pushed past active heating elements in the duct with air exiting at the first of the other two vents on the inside of the vehicle. Flaps in the first of the other two vents are pushed to close off the exit of air to the outside of the vehicle at the second of the other two vents. Thus, air is forced over the active heater and circulated back into the vehicle to warm the air inside the vehicle.

During the heating of the interior of the vehicle, battery power may be the most used source of power since the sun may not always be available or adequate when temperatures are low. Since the heater and the fan are both used and the heater requires so much more power than the fan, a power control circuit is used to regulate the power to the fan and heater. The power control circuit will, based on the current draw from the heater and fan, decide whether to provide power from the solar cells or battery or both. Also, it will prevent the battery from discharging so much that the vehicle cannot be started. It will also cut off all power for the heater and fan if neither power source can provide enough power. Also, the battery used may be the vehicle battery, or an auxiliary battery that does not provide power to any other parts of, the vehicle.

Accordingly, it is a principal object of the invention to provide a system for maintaining an unoccupied vehicle at a more comfortable temperature relative to the outside temperature using both heating and cooling as appropriate.

It is another object of the invention to provide a system for maintaining an unoccupied vehicle at a more comfortable temperature using solar power and battery as power sources.

It is a further object of the invention to provide a system for maintaining an unoccupied vehicle at a more comfortable temperature using solar power and battery as power sources and using a controller to regulate power to the heater and fan which also prevents damaging discharge of the battery.

Still another object of the invention is to provide a system for maintaining an unoccupied vehicle at a more comfortable temperature using a duct system with flaps and vents for providing circulation and heating of excessively cold air or exhaustion of excessively hot air inside the vehicle.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
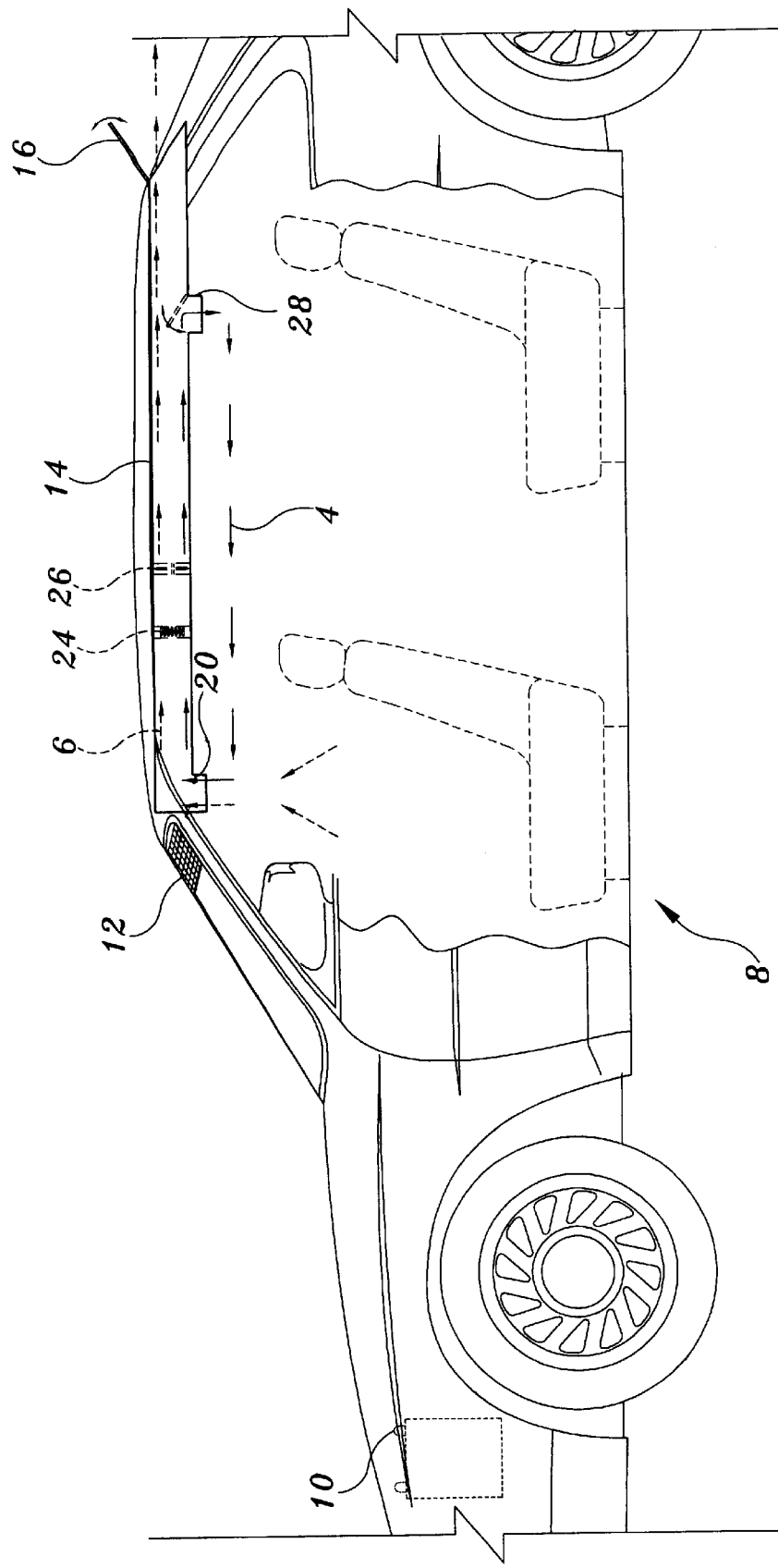
FIG. 1 is an environmental, perspective view of a solar powered heating and ventilation system for a vehicle according to the present invention.

The present invention, as shown in FIG. 1, is a system for providing an unoccupied vehicle 8 with a more comfortable temperature relative to the outside temperature using both heating with heater 24 and fan 26, and cooling with fan 26 only, which are mounted inside an air duct 14.

The air duct 14 has a front input vent 20 and rear vents 28 and 16. The system also uses an electronic solar panel 12 and battery 10 as power sources.

Figure 2:
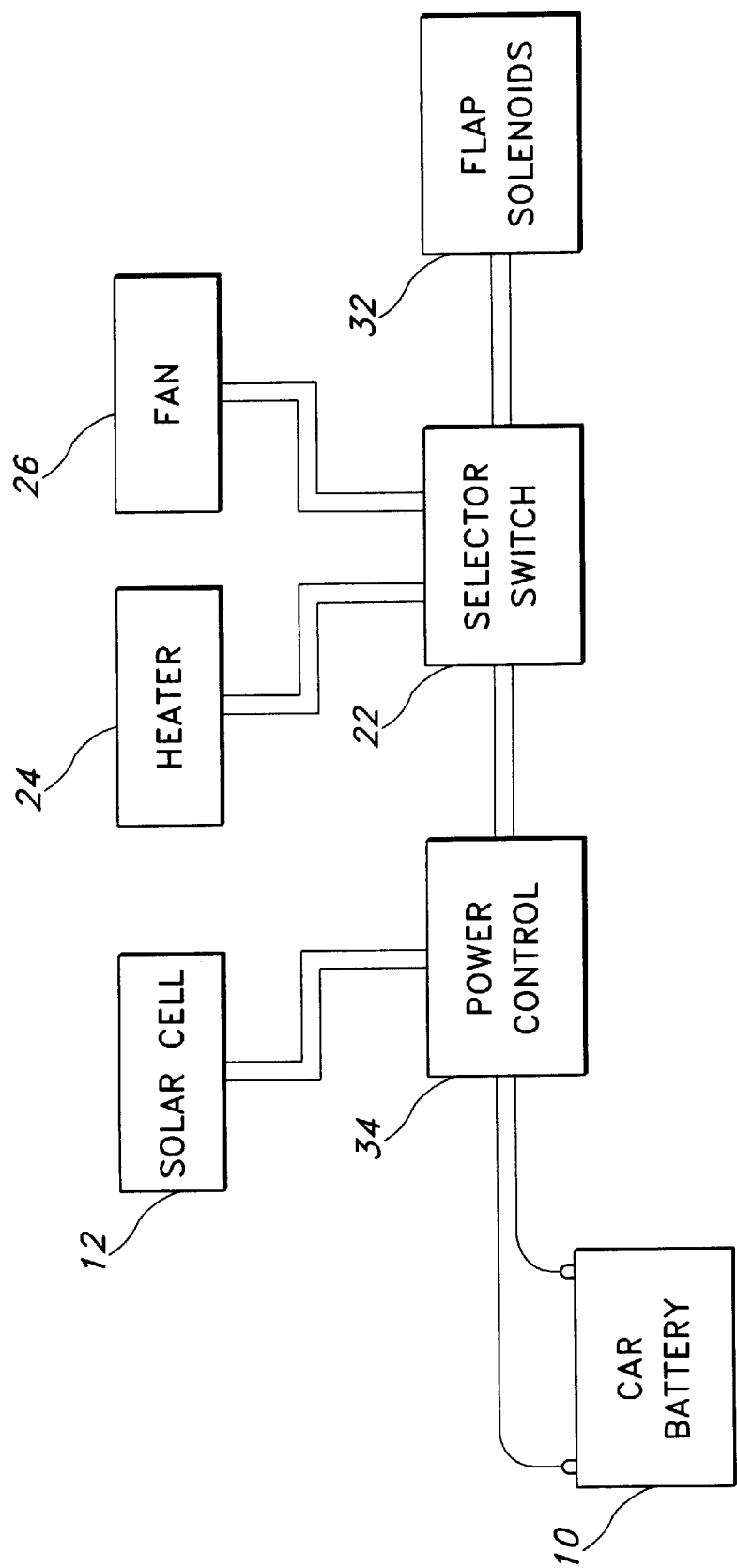
FIG. 2 is a block diagram of the solar powered heating and ventilation system according to the present invention.

The system provides power to the fan 26 and heating elements 24 via a selector switch 22 and power. control circuits 34 as shown in FIG. 2.

The power control circuits 34 in FIG. 2 are connected to the vehicle battery 10 and electronic solar power cells 12 which provide the typical twelve volts DC. The battery 10 can be the sole battery in the vehicle 8, or a deep cycle auxiliary battery can be provided which does not provide power to any other parts of the vehicle 8. Both batteries maybe charged by the engine of the vehicle 8. The fan 26 and heater 24 are chosen to use the typical twelve volts DC power available in most vehicles and trucks.

During the heating of the interior of the vehicle 8, battery power 10 may be the most used source of power since the sun may not always be available or adequate when ambient outside temperatures are low. Also, the solar power cells 12 often do not provide as much power as the battery 10 or as much power as needed by the heater 24. When heating, the heater 24 and the fan 26 are both used and the heater 24 requires much more power than the fan 26. In such a case, the battery or combination of battery and solar power cells may provide enough power for the heater 24 and fan 26. During cooling of the interior of the vehicle 8 only the power required by the fan 26 is needed. In such a case, the solar power cells 12 may provide enough power for fan 26. During both heating and cooling there may be some electrical power needed for changing the position of electrically operated flaps via flap solenoids 32 on the vents 16 and 18. Therefore, the power control circuit 34 is used to regulate the power to the fan 26, heater 24 and electrically operated flaps 32.

First, the power control circuit 34 prevents the battery 10 from going into a deep discharge. A deep discharge of the battery 10 could prevent the battery 10 from being charged and could prevent the vehicle 8 from starting, if the battery 10 is the only battery in the vehicle 8. The power control circuit 34 prevents the deep discharge by cutting off power supplied by the battery 10 to the system, before the deep discharge state occurs by sensing the discharge state of the battery 10.

Second, the power control circuit 34 decides whether to supply power to the fan 26 and heater 24 from either the solar cells 12 or the battery 10 or both the solar cells 12 and battery 10 based on the sensed amperage needed by the heater 24 and fan 26 and based on the sensed amperage available from the solar cells 12 and battery 10. Therefore, the power control circuit 34 has voltage and amperage sensors, control relays and a controller. The power control circuit 34 could also use information from the selector switch 22, so that it knows whether cooling or heating has been selected, since cooling uses less power than heating.

Third, the power control circuit 34 may decide when to provide power from the vehicle 8 battery or the auxiliary battery.

The selector switch 22 provides several functions. It allows the user who is about the leave the vehicle 8 unoccupied for awhile to select between a cooling and heating operation of the system.

Figure 3:
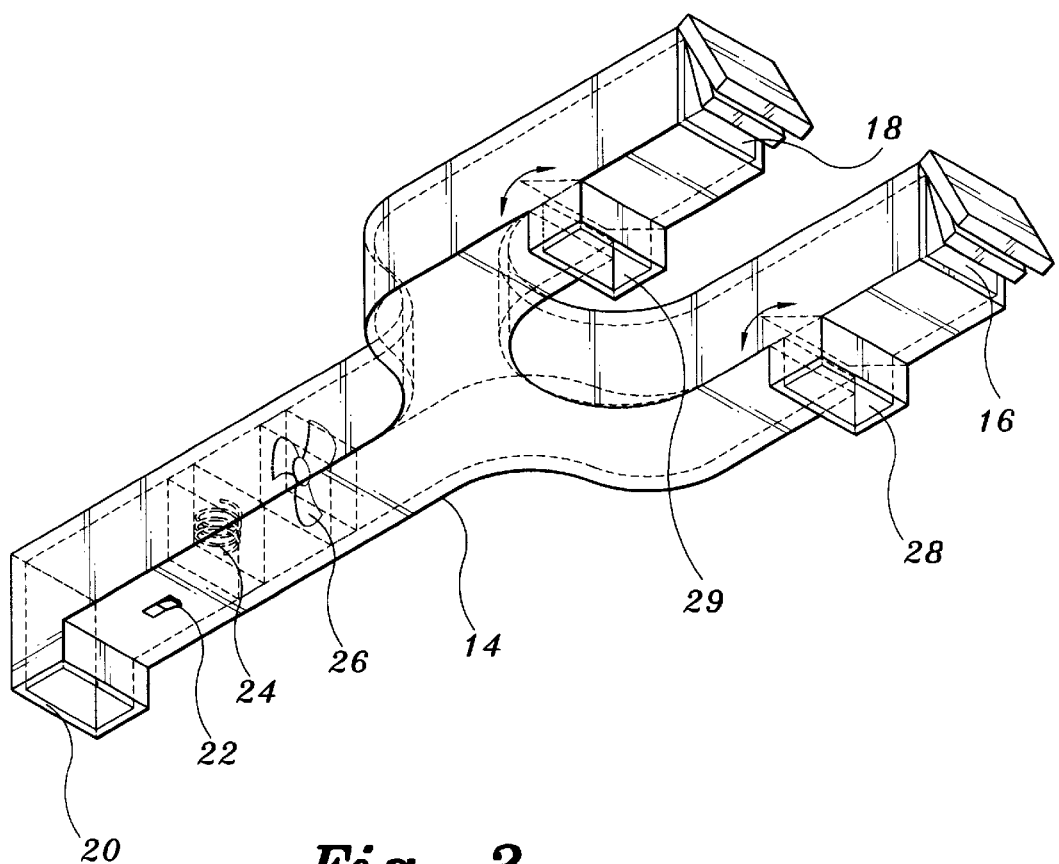
FIG. 3 is a perspective view of the duct and flap system according to the present invention.

When set to cooling operation, the switch 22 will turn on only the fan 26 and operate flaps mechanically or electrically so that the flaps for vents 16 and 18 open and the flaps for vents 28 and 29 close as shown in FIGS. 1 and 3.

When set to heating operation, the switch 22 will turn on the fan 26 and heater 24 and operate flaps mechanically or electrically so that the flaps for vents 16 and 18 are closed and the flaps for vents 28 and 29 are open as shown in FIGS. 1 and 3.

In the case of mechanical operation of the flaps, the switch 22 is an electrical switch that is connected mechanically to the flaps with levers or rods. In case of electrical operation of the flaps, switch 22 is connected to solenoid 32 that pulls open or closed the appropriate flap or set of flaps in vents 28 or 16. It is also possible for the switch 22 to control the flow of vacuum to vacuum operated levers to open and close the flaps in vents 28 or 16.

As shown in FIGS. 1 and 3, the duct system 14 is located on[0ax4]he interior ceiling of the vehicle 8 and has at least three vents. The duct system 14 may be located above the head liner of the ceiling of the vehicle 8, with the vents 20, 28 and 29 mounted through holes in the head liner. The first vent 20 is located on one side of the fan 26 and heater 24, usually toward the front of the vehicle 8. The first vent 20 needs no flap and provides recirculated heated air intake 4 from the interior of the vehicle 8 to the fan 26 and heater 24. The first vent 20 also provides air intake 6 of hot air to be exhausted from the interior of the vehicle 8 to the fan 24 during cooling. The first input vent 20 may have a filter to prevent dust and dirt accumulation on the heater 26, which might ignite and start a fire.

In FIG. 1 a first rear vent and flap 28 is located on an opposite side of the fan 26 and heater 24 inside the vehicle 8, further down the length of the duct 14 and usually toward the rear of the vehicle 8. When rear vent flap 28 is forced open during heating, air flow 4 heated by heater 24 and pushed by fan 26 is recirculated from the first or front vent 20 to be heated further by heater 24 so that the temperature of the vehicle 8 may increase. Also, when rear vent flap 28 is electrically or mechanically forced open during heating and the flap 28 is positioned, sized and hinged as shown, it will block air flow 6 from being exhausted out the rear exterior vent 16 and outside of the vehicle 8. In addition, when rear vent flap 28 is electrically or mechanically forced open during heating, the rear exterior vent flap 16 can be electrically or mechanically forced closed so air flow 6 is further prevented from being exhausted out the rear exterior of the vehicle 8.

When rear vent flap 28 is forced closed during cooling, hot air flow 6 input by front vent 20 is forced by fan 26, to the rear exterior vent 16 and recirculated air flow 4 stops flowing. Also, when rear vent flap 28 is electrically or mechanically forced closed during cooling, a flap in the rear exterior vent 16 can be electrically or mechanically forced open so that air flow 6 is exhausted outside vehicle 8 through vent 16.

As shown in FIG. 1, front vent 20 and rear vent 28 are located as openings at the bottom of the duct 14 in the interior of vehicle 8. Rear exterior vent and flap 16 is located just below the roof and above the rear window of the vehicle 8 for exhausting hot interior air.

Because rear vent flap 28 can be positioned, sized and hinged as shown to provide almost 100% control over the cooling 6 and heating 4 air flows, the flap in the rear exterior vent 16 does not require mechanical (levers or rods) or electrical operation (fan solenoid 32 in FIG. 2) controlled by the selector switch 22. On the other hand, the flap in exterior vent 16 is needed to keep the rain and dust outside of the vehicle 8 from coming in the duct 14. Therefore, the flap in exterior vent 16 may be a fixed grill like louver, or a passively moved (via air flow 6 and fan 26) hinged flap.

In FIG. 3 another embodiment of the duct system 14 is shown. Instead of the rear vents 16 and 28 on the opposite side of the fan 26 and heater 24, the duct system 14 splits or forks off into two parts that lead further to two sets of rear vents 16, 18, 28 and 29. The whole duct system 14 forms a 'Y' shape. The two vents and flaps 28, 29 are located on the other side of the fan 26 and heater 24 further down the forked sections of duct 14, but still in the interior of the vehicle 8. The vent flaps 28 and 29 open to allow air flow 4 into the interior of the vehicle 8 and provide circulation of air forced by fan 26 back inside the vehicle 8 to the front vent 20 and heater 24 during heating. See air flow 4 in FIG. 1. During cooling, the two vent flaps 28 and 29 close so that hot interior air input through vent 20 is exhausted out to the exterior of the vehicle 8 at the two open vent flaps 16 and 18. See air flow 6 in FIG. 1. The rearmost vents and flaps 16 and 18 are located at the end of the two parts of duct 14 and open to the exterior of the vehicle 8 and are located just below the roof and above the rear window of the vehicle 8 for exhausting hot interior air.

Optionally, flaps in vents 16 and 18 are not needed, if the flaps in each of vents 28 and 29 are hinged and positioned in duct system 14 as shown in FIG. 3. During heating selected by selector switch 22, if the flaps in vents 28 and 29 are opened all the way until their edges reach the top of the duct system 14 and cover the area of duct 14 leading to the vents 16 and 18 further along the duct 14, then the flaps in vents 28 and 29 will effectively prevent air from flowing back to exterior vents 16 and 18 and let all interior air back into the vehicle 8 through interior vents 28 and 29. During cooling selected by selector switch 22, if the flaps in vents 28 and 29 are closed all the way and covering the opening of vents 28 and 29, then the flaps in vents 28 and 29 will effectively prevent interior air from flowing back into the vehicle 8 and all interior air will exhaust to the outside of the vehicle 8 via vents 16 and 18.

Therefore, flaps in vents 16 and 18 in this example, do not need to be controlled by selector switch 22. Instead flaps in vents 16 and 18 can be fixed louvers or loose hinged flaps, so that they keep rain and dust from the outside of the vehicle 8 from entering the duct system 14.

In operation, when a user realizes a need to cool the interior of the vehicle 8, while it sits unoccupied, he sets the selector switch 22 to the cooling position before leaving the vehicle 8. In the cool position the selector switch 22 allows only the fan 26 to operate and mechanically (using levers) or electrically (flap solenoid 32 in FIG. 2) opens flaps in vents 16 and 18 and closes flaps in vents 28 and 29. Then hot interior air flow 6 enters the duct 14 through the first vent 20 pulled by the fan 26 mounted in the duct system 14 to the open flaps in rear vents 16 and 18 external to the vehicle 8 so that air flow 6 can be exhausted out the vehicle 8. Closed flaps 28 and 29 close off the exit of air flow 6 back into the interior of the vehicle 8.

In operation, when the user realizes there is a need to heat the insides of the vehicle 8 while unoccupied due to some lack of sun and cold outside temperatures, he sets the selector switch 22 to the heating position before leaving the vehicle 8. In the heating position the selector switch 22 allows the fan 26 and heater 24 to operate and mechanically (using vacuum or levers) or electrically (flap solenoid 32 in FIG. 2) closes flaps in vents 16 and 18 and opens flaps in vents 28 and 29. Air flow 4 from inside the vehicle 8 enters the duct 14 through the front vent 20 pulled in by the fan 26 and pushed past active heating elements 24. Air flow 4 exits at the open flaps in vents 28 and 29 back into the interior of the vehicle 8. The flaps in vents 16 and 18 are forced to close off the exit of air flow 4 or 6 to the outside of vehicle 8 and prevent rain and dust from outside the vehicle 8 from entering the duct 14. Thus, inside air flow 4 is forced over the heater 24 and fan 26 and back into the interior of vehicle 8 to warm and rewarm the inside air flow 4 of the vehicle 8.

It is to be understood that the present invention is not limited to the embodiments described above, but encompasses any and all embodiments within the scope of the following claims.

I claim:

1. A solar powered heating and cooling system for a vehicle comprising:

a duct system mounted on a ceiling of the vehicle;

a fan mounted inside of said duct system;

a heater mounted inside of said duct system;

a first vent mounted at a front end of said duct system away from said fan and said heater for accepting air input from an interior of the vehicle, said duct system extending away from a position of said fan and said heater to a rear of said vehicle;

a second and third vent and flap assembly mounted in a section of said extended duct system inside the vehicle for circulating air input from said first vent back into the vehicle interior at said second vent and preventing air from exhausting out the third vent during heating while said flap is in an open position;

said third vent being mounted in a rear end of said extended duct system for exhausting air input from said first vent out of said vehicle at said third vent while said flap is in a closed position covering said second vent during cooling;

a power controller;

a battery coupled to said power controller as a power source;

solar power cells coupled to said power controller as a power source;

a selector switch coupled to said power controller to receive electrical power and electrically coupled to said fan and said heater, said selector switch being configured to select a heating operation by providing power to said fan and said heater and said selector switch being configured to select a cooling operation by providing power to said fan;

said selector switch controlling the opening and closing of said flap and;

said power controller being configured to regulate power provided to said selector switch.

2. A solar powered heating and cooling system for a vehicle as claimed in claim 1, wherein said third vent further includes a flap to passively provide protection for said duct system from rain and dust external to said vehicle.

3. A solar powered heating and cooling system for a vehicle as claimed in claim 2, wherein said power controller is configured to select power from one of said battery and said solar power cells and both based on current needed by said fan and said heater during heating or cooling as selected by said selector switch.

4. A solar powered heating and cooling system for a vehicle as claimed in claim 3, wherein said power controller is configured to prevent deep discharge of said battery.

5. A solar powered heating and cooling system for a vehicle as claimed in claim 2, wherein said battery is an auxiliary battery that does not provide power to other parts of said vehicle and said power controller is configured to select power from one of said auxiliary battery and said solar power cells and both based on current needed by said fan and said heater during heating or cooling as selected by said selector switch.

6. A solar powered heating and cooling system for a vehicle as claimed in claim 5, wherein said power controller is configured to prevent deep discharge of said auxiliary battery.

7. A solar powered heating and cooling system for a vehicle as claimed in claim 1, wherein said third vent further includes a flap controlled by said selector switch to open and exhaust interior air during cooling when said flap on said second vent is closed and said flap on said third vent is controlled by said selector switch to close during heating while said flap on said second vent is open.

8. A solar powered heating and cooling system for a vehicle as claimed in claim 7, wherein said power controller is configured to select power from one of said battery and said solar power cells and both based on current needed by said fan and said heater during heating or cooling as selected by said selector switch.

9. A solar powered heating and cooling system for a vehicle as claimed in claim 8, wherein said power controller is configured to prevent deep discharge of said battery.

10. A solar powered heating and cooling system for a vehicle as claimed in claim 7, wherein said battery is an auxiliary battery that does not provide power to other parts of said vehicle and said power controller is configured to select power from one of said auxiliary battery and said solar power cells and both based on current needed by said fan and said heater during heating or cooling as selected by said selector switch.

11. A solar powered heating and cooling system for a vehicle as claimed in claim 10, wherein said power controller is configured to prevent deep discharge of said auxiliary battery.

12. A solar powered heating and cooling system for a vehicle comprising:

a duct system mounted on the ceiling of said vehicle;

a fan mounted inside of said duct system;

a heater mounted inside of said duct system;

a first vent mounted at a front most end of said duct system away from said fan and said heater for accepting air input from an interior of said vehicle;

said duct system splitting off into two sections extending away from a position of said fan and said heater and going back toward the rear of said vehicle;

a second vent and flap assembly in a first of said two sections within said extended duct inside said vehicle and a third vent and flap assembly in a second of said two sections within said extended duct inside said vehicle for circulating air input from said first vent back into said vehicle interior at said second and third vent and while said flaps in said second and third assemblies are in an open position and prevent air from exhausting out a fourth and fifth vent during heating;

said fourth vent mounted at a rear most end of said first of said two sections within said extended duct system and said fifth vent mounted at a rear most end of said second of said two sections within said extended duct system for exhausting air input from said first vent out at said fourth and fifth vent of said vehicle while said flaps in said second and third assemblies cover said second and third vent during cooling;

a battery coupled to a power controller as a power source;

solar power cells coupled to said power controller as a power source;

a selector switch coupled to said power controller to receive electrical power and coupled to said fan and said heater;

said selector switch configured to select a heating operation by providing power to said fan and said heater and said selector switch configured to select a cooling operation by providing power to said fan;

said selector switch controls the opening and closing of said flaps of said second and third assemblies and;

said power controller is configured to regulate power provided to said selector switch.

13. A solar powered heating and cooling system for a vehicle as claimed in claim 12, wherein said fourth vent includes a flap and said fifth vent includes a flap both controlled by said selector switch to open and exhaust interior air during cooling when said flaps on said second vent and third vents are closed and said flaps on said fourth and fifth vent are controlled by said selector switch to close during heating while said flaps on said second and third vent are open.

14. A solar powered heating and cooling system for a vehicle as claimed in claim 13, wherein said power controller is configured to select power from one of said battery and said solar power cells and both based on current needed by said fan and said heater during heating or cooling as selected by said selector switch.

15. A solar powered heating and cooling system for a vehicle as claimed in claim 14, wherein said power controller is configured to prevent deep discharge of said battery.

16. A solar powered heating and cooling system for a vehicle as claimed in claim 12, wherein said fourth and fifth vents each includes a flap to passively provide protection for said duct system from rain and dust external to said vehicle.

17. A solar powered heating and cooling system for a vehicle as claimed in claim 16, wherein said power controller is configured to select power from one of said battery and said solar power cells and both based on current needed by said fan and said heater during heating or cooling as selected by said selector switch.

18. A solar powered heating and cooling system for a vehicle as claimed in claim 17, wherein said power controller is configured to prevent deep discharge of said battery.

19. A solar powered heating and cooling system for a vehicle comprising:

a duct system mounted on the ceiling of said vehicle;

a fan mounted inside of said duct system;

a heater mounted inside of said duct system;

a first vent mounted at a front most end of said duct system away from said fan and said heater for accepting air input from an interior of said vehicle;

said duct system extending from a position of said fan and said heater to a rear of said vehicle;

a second vent and flap assembly mounted in a section of said extended duct system inside said vehicle for circulating air input from said first vent back into said vehicle interior at said second vent and said flap of said second assembly opens and prevents air from exhausting out a third vent during heating;

said third vent and flap assembly mounted at a rear most end of said duct system in said extended duct system for exhausting air input from said first vent out of said vehicle through said flap of said third vent while said flap of said second assembly closes and covers said second vent during cooling;

a battery coupled to a power controller as a power source;

solar power cells coupled to said power controller as a power source;

a selector switch coupled to said power controller to receive electrical power and coupled to said fan and said heater to select between a heating or a cooling operation said selector switch controls an opening and closing of said second and third flaps;

said power controller is configured to regulate power provided to said selector switch.

20. A solar powered heating and cooling system for a vehicle as claimed in claim 19, wherein said power controller is configured to select power from one of said battery and said solar power cells and both based on current needed by said fan and said heater during heating or cooling as selected by said selector switch and wherein said power controller is configured to prevent deep discharge of said battery.

* * * * *